US011136113B2

(12) United States Patent
Cottet et al.

(10) Patent No.: US 11,136,113 B2
(45) Date of Patent: Oct. 5, 2021

(54) SINGLE AXLE, SEMI-LEVERED LANDING GEAR WITH SHORTENING MECHANISM

(71) Applicant: The Boeing Company, Chicago, IL (US)

(72) Inventors: Justin D. Cottet, Snohomish, WA (US); Mitchell Mellor, Bothell, WA (US); Michael L. Drake, Bellevue, WA (US); George Sonnenburg, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 16/418,021

(22) Filed: May 21, 2019

(65) Prior Publication Data

US 2019/0270513 A1 Sep. 5, 2019

Related U.S. Application Data

(63) Continuation of application No. 15/415,346, filed on Jan. 25, 2017, now Pat. No. 10,384,767.

(51) Int. Cl.
*B64C 25/12* (2006.01)
*B64C 25/20* (2006.01)
(Continued)

(52) U.S. Cl.
CPC .............. *B64C 25/12* (2013.01); *B64C 25/10* (2013.01); *B64C 25/20* (2013.01); *B64C 25/22* (2013.01);
(Continued)

(58) Field of Classification Search
CPC ......... B64C 25/12; B64C 25/20; B64C 25/22; B64C 25/34; B64C 25/60; B64C 2025/125
See application file for complete search history.

(56) References Cited

U.S. PATENT DOCUMENTS 2,256,540 A 9/1941 Armstrong
2,420,066 A 5/1947 Hugh
(Continued)

FOREIGN PATENT DOCUMENTS

EP 0246949 11/1987
EP 2138398 12/2009
(Continued)

OTHER PUBLICATIONS

European Search Report, European Application No. 19188563, dated Dec. 16, 2019.

(Continued)

*Primary Examiner* — Marc Burgess
(74) *Attorney, Agent, or Firm* — Perman & Green, LLP

(57) ABSTRACT

A landing gear including a shock strut assembly including an outer cylinder coupled to an airframe, a wheel movably coupled to the outer cylinder so as to reciprocate substantially along a longitudinal axis of the outer cylinder, and a shrink mechanism including a pivot arm pivotally coupled to the shock strut assembly, a drive member coupling the pivot arm to a landing gear retract mechanism, a driven member coupled to the pivot arm, a first shrink link member coupled to the pivot arm by the driven member, and a second shrink link member coupled to the first shrink link member and to the shock strut assembly. Rotation of the pivot arm by the drive member, effects a folding movement between the first shrink link member and the second shrink link member, and the folding movement effects at least a retraction of the wheel relative to the outer cylinder.

18 Claims, 12 Drawing Sheets

(51) Int. Cl.
*B64C 25/60* (2006.01)
*B64C 25/10* (2006.01)
*B64C 25/34* (2006.01)
*B64C 25/22* (2006.01)

(52) U.S. Cl.
CPC .............. *B64C 25/34* (2013.01); *B64C 25/60* (2013.01); *B64C 2025/125* (2013.01)

(56) References Cited

U.S. PATENT DOCUMENTS

| | | | |
|---|---|---|---|
| 2,754,072 | A | 7/1956 | Shapiro |
| 2,933,271 | A | 4/1960 | Maltby |
| 2,967,682 | A | 1/1961 | Fullam et al. |
| 4,540,142 | A | 9/1985 | Veaux et al. |
| 4,749,152 | A | 6/1988 | Veaux et al. |
| 5,100,083 | A | 3/1992 | Large et al. |
| 5,299,761 | A | 4/1994 | Robin et al. |
| 5,429,323 | A | 7/1995 | Derrien et al. |
| 5,460,340 | A | 10/1995 | White |
| 5,482,228 | A | 1/1996 | Hoshino |
| 6,182,925 | B1 | 2/2001 | Kilner et al. |
| 8,376,272 | B2 | 2/2013 | Bennett et al. |
| 8,448,900 | B2 | 5/2013 | Mellor et al. |
| 8,991,753 | B2 | 3/2015 | Mellor et al. |
| 8,998,133 | B2 | 4/2015 | Cottet |
| 9,481,452 | B2 | 11/2016 | Lindahl et al. |
| 9,499,280 | B2 | 11/2016 | Mellor |
| 10,384,767 | B2 * | 8/2019 | Cottet .................... B64C 25/12 |
| 10,766,608 | B2 | 9/2020 | Mellor et al. |
| 10,800,516 | B2 | 10/2020 | Dahl et al. |
| 2009/0050736 | A1 | 2/2009 | Bennett et al. |
| 2009/0321560 | A1 | 12/2009 | Luce et al. |
| 2010/0116930 | A1 | 5/2010 | Griffin |
| 2010/0181423 | A1 | 7/2010 | Martin et al. |
| 2010/0219290 | A1 | 9/2010 | Luce |
| 2010/0288878 | A1 | 11/2010 | Bennett |
| 2011/0233327 | A1 | 9/2011 | Mellor et al. |
| 2013/0341457 | A1 | 12/2013 | Wilson |
| 2017/0253323 | A1 | 9/2017 | Green et al. |
| 2018/0001998 | A1 | 1/2018 | Bennett |
| 2018/0162522 | A1 | 6/2018 | Luce |
| 2018/0208298 | A1 | 7/2018 | Cottet et al. |
| 2019/0039723 | A1 | 2/2019 | Dubrovsky et al. |
| 2019/0185147 | A1 | 6/2019 | Luce |

FOREIGN PATENT DOCUMENTS

| | | |
|---|---|---|
| EP | 2489591 | 8/2012 |
| EP | 3213992 | 9/2017 |
| EP | 3335988 | 6/2018 |
| EP | 3437990 | 2/2019 |
| GB | 484938 | 5/1938 |
| GB | 610698 | 10/1948 |
| GB | 670889 | 4/1952 |
| GB | 1216732 | 12/1970 |
| GB | 2137147 | 10/1984 |
| JP | 08338045 | 12/1996 |
| JP | 2011504829 | 2/2011 |
| JP | 2012111479 | 6/2012 |
| WO | 2006094145 | 9/2006 |
| WO | 2009047367 | 4/2009 |
| WO | 2011119283 | 9/2011 |

OTHER PUBLICATIONS

Currey, Norman S. "Landing Gear Design Handbook". Lockheed-Georgia Company, First Edition, Jan. 1982. Revised Jul. 1984.
Federal Aviation Administration, "Aviation Maintenance Technician Handbook—Airframe, Chapter 13", (2013), downloaded from faa.gov on Aug. 9, 2016.
European Search Report, European Application No. 18173205, dated Jul. 18, 2018.
European Search Report, European Application No. 18155880, dated Jul. 26, 2018.
European Search Report, European Application No. 17203711, dated Jan. 8, 2018.
Japanese Office Action, Japanese Application No., 2018021945 dated Apr. 1, 2019.
European Search Report, European Application No. 19152374, dated May 15, 2019.
Torsion Sway Bar; dated Apr. 1, 2021; https://carlisuspension.com/product/dodge/dodge-ram-2500-3500/ram-components/13-18-3500-components/torsion-sway-bar/.
CE-9900XJF—XJ/MJ Antirock Front Sway Bar Kit; dated Apr. 1, 2021; https://www.rockjock4x4.com/CE-9900XJF.
European Search Report, European Application No. 18173205.8, dated Mar. 18, 2021.

* cited by examiner

SINGLE AXLE, SEMI-LEVERED LANDING GEAR WITH SHORTENING MECHANISM

CROSS-REFERENCE TO RELATED APPLICATIONS

This application is a continuation of and claims the benefit of U.S. Non-Provisional patent application Ser. No. 15/415,346 filed on Jan. 25, 2017, the disclosure of which is incorporated by reference herein in its entirety.

BACKGROUND

1. Field

The exemplary embodiments generally relate to aircraft landing gear systems and aircraft incorporating those landing gear systems and in particular to landing gear assemblies having a shortened length for stowing the landing gear after retraction while providing the aircraft with increased rotation on takeoff.

2. Brief Description of Related Developments

An aircraft generally includes landing gear to facilitate takeoff, landing and taxi. For takeoff and landing of the aircraft, a taller landing gear is desired to generate a greater angle of rotation (e.g. angle of attack) of the aircraft. The landing gear of some aircraft includes a multi-axle truck beam pivotally coupled to a shock strut at, for example, a distal or lower end of the shock strut to achieve taller takeoff heights; however multi-axle landing gear increases weight and complexity of the landing gear.

For single axle landing gear, additional ground clearance for rotation of the aircraft during takeoff is achieved by increasing the height of landing gear. However, in order to increase the takeoff height using a single axle landing gear, the increased length results in the landing gear being moved further outboard, from the aircraft fuselage, along the wing to compensate for the increased length of the landing gear on stowage. Further, increasing the length of the single axle landing gear increases the static height of the aircraft resulting in the need for new sill waterlines, longer and higher exit slides, a landing gear actuation mechanism redesign, the need for off wing exit slides, landing gear stowage compartment redesign, etc.

SUMMARY

The following is a non-exhaustive list of examples, which may or may not be claimed, of the subject matter according to the present disclosure.

One example of the subject matter according to the present disclosure relates to a semi-levered landing gear including a shock strut, having an inner cylinder and an outer cylinder, the shock strut configured for coupling to an airframe of an aircraft, a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end, a tension link assembly having a tension link assembly first end, a tension link assembly second end, and at least one tension link assembly rotation axis disposed between the tension link assembly first end and the tension link assembly second end, the tension link assembly first end being coupled to the shock strut outer cylinder, and the tension link assembly second end being coupled to the truck lever second end, and a positioning mechanism being configured for coupling to one or more of the airframe and the shock strut and being coupled to the tension link assembly proximate the tension link assembly first end, wherein the tension link assembly is configured to rotate the truck lever about the truck pivot axis of rotation between a truck lever extended position and a truck lever stowed position.

Another example of the subject matter according to the present disclosure relates to an aircraft including an airframe, and a semi-levered landing gear including a shock strut coupled to the airframe, a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end, a tension link assembly having a tension link assembly first end, a tension link assembly second end and at least one tension link assembly rotation axis disposed between the tension link assembly first end and the tension link assembly second end, the tension link assembly first end coupled to the shock strut, and the tension link assembly second end being coupled to the truck lever second end, a positioning mechanism coupled to one or more of the airframe and the shock strut and being coupled to the tension link assembly proximate the tension link assembly first end, wherein the tension link assembly is configured to rotate the truck lever about the truck pivot axis of rotation between a truck lever extended position and a truck lever stowed position.

Still another example of the subject matter according to the present disclosure relates to a semi-levered landing gear including a shock strut coupled to an airframe of an aircraft about a trunnion axis of rotation, a retraction mechanism coupled to the airframe, a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end, a tension link assembly having a tension link assembly first end, a tension link assembly second end and at least one tension link assembly rotation axis disposed between the tension link assembly first end and the tension link assembly second end, the tension link assembly first end being coupled to the shock strut, and the tension link assembly second end being coupled to the truck lever second end, and a positioning mechanism being configured for coupling to one or more of the airframe and the shock strut and being coupled to the tension link assembly proximate the tension link assembly first end, wherein rotation of the truck lever about the truck pivot axis of rotation between a truck lever extended position and a truck lever stowed position is mechanically slaved to rotation of the shock strut about the trunnion axis of rotation.

BRIEF DESCRIPTION OF THE DRAWINGS

Figure 1A:
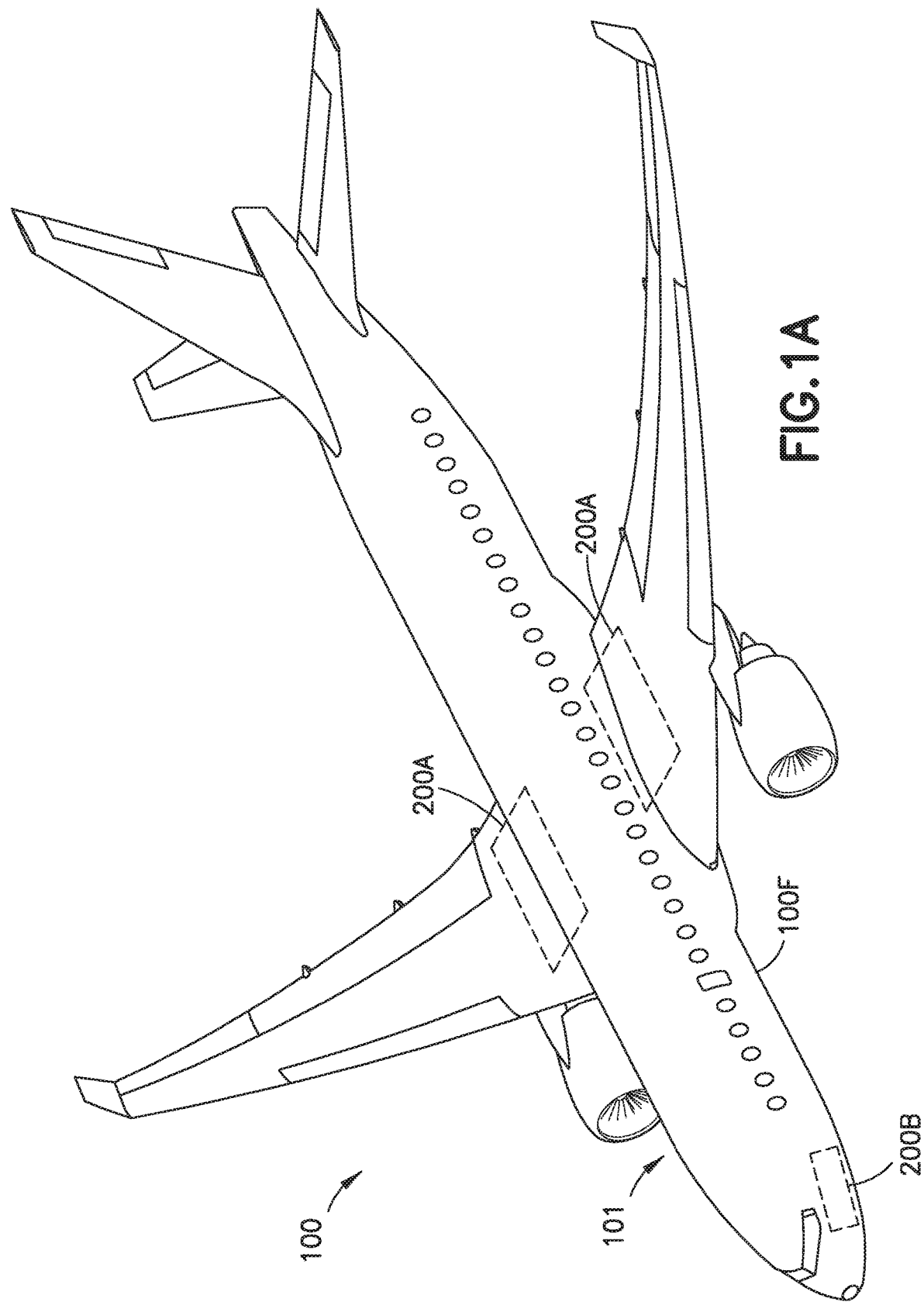
Figure 1B:
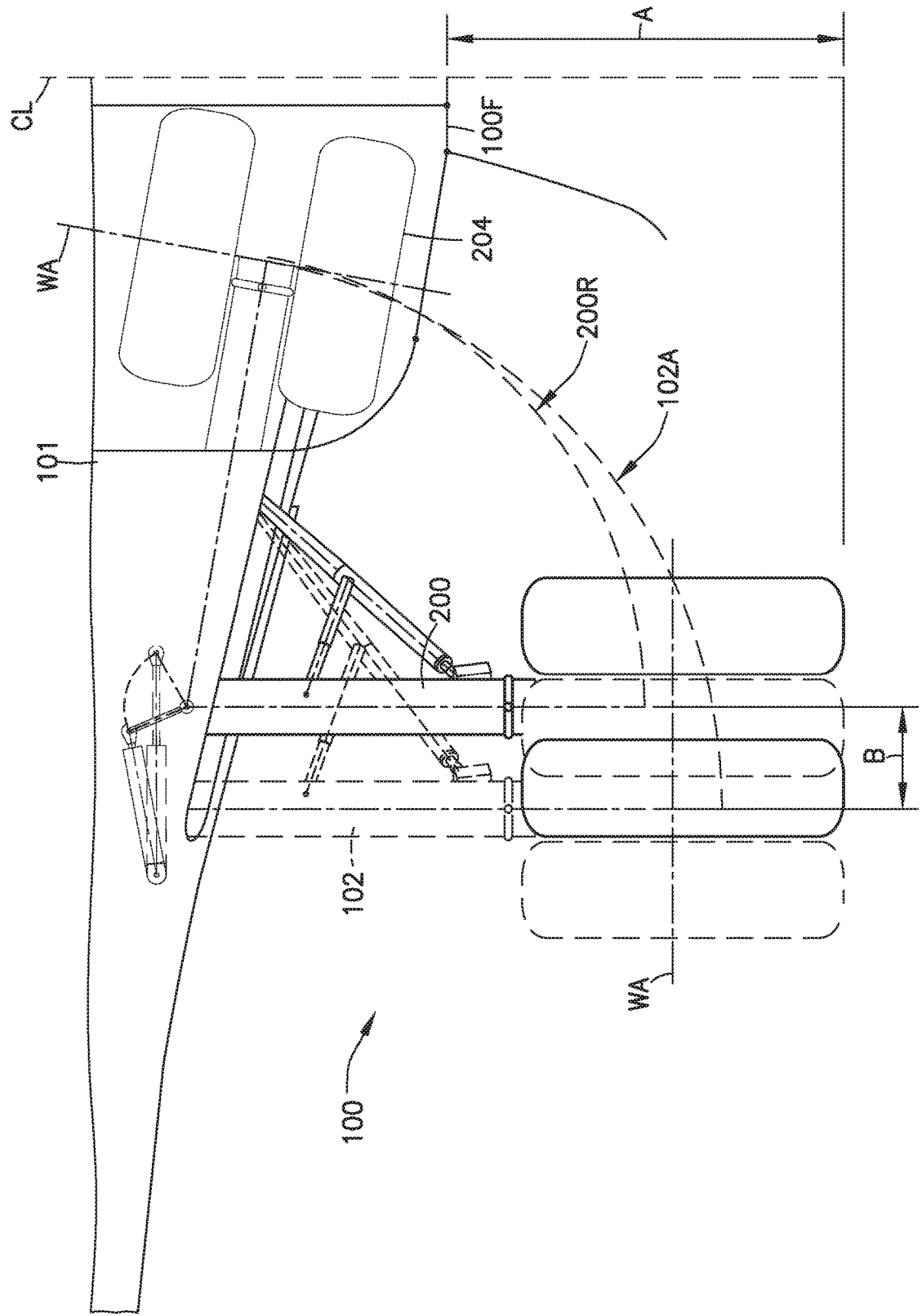
Figure 1C:
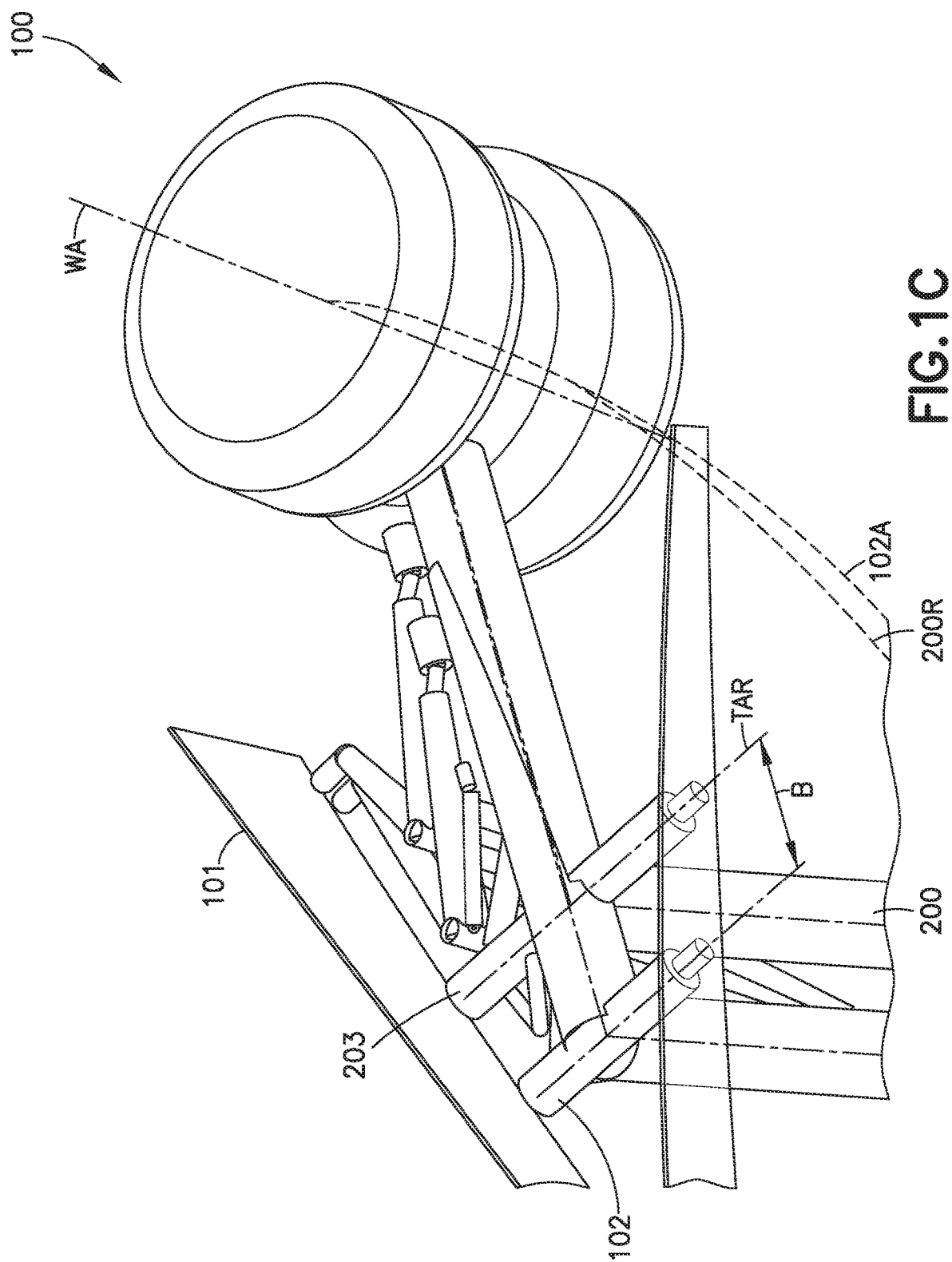
Figure 2:
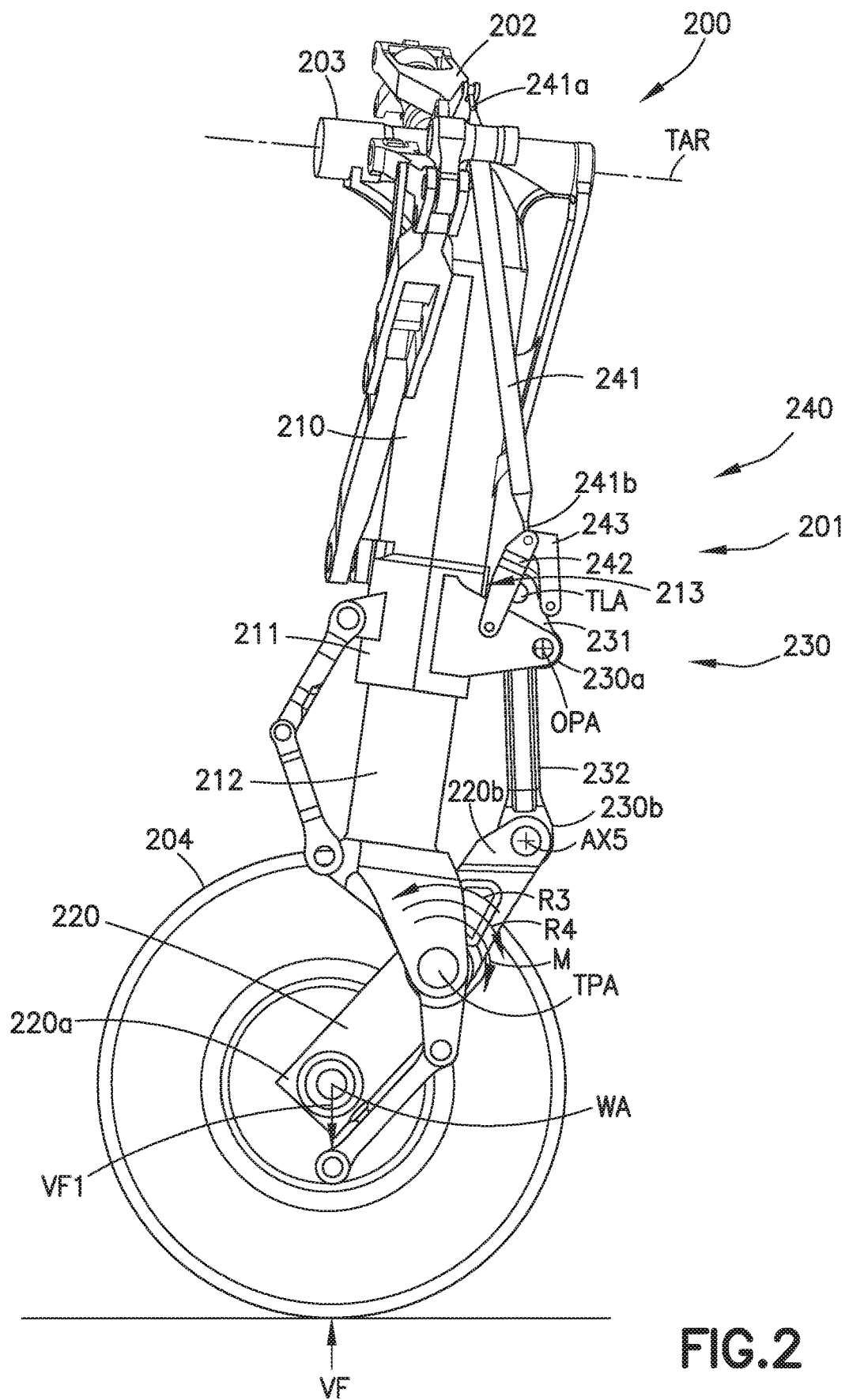
Figure 3:
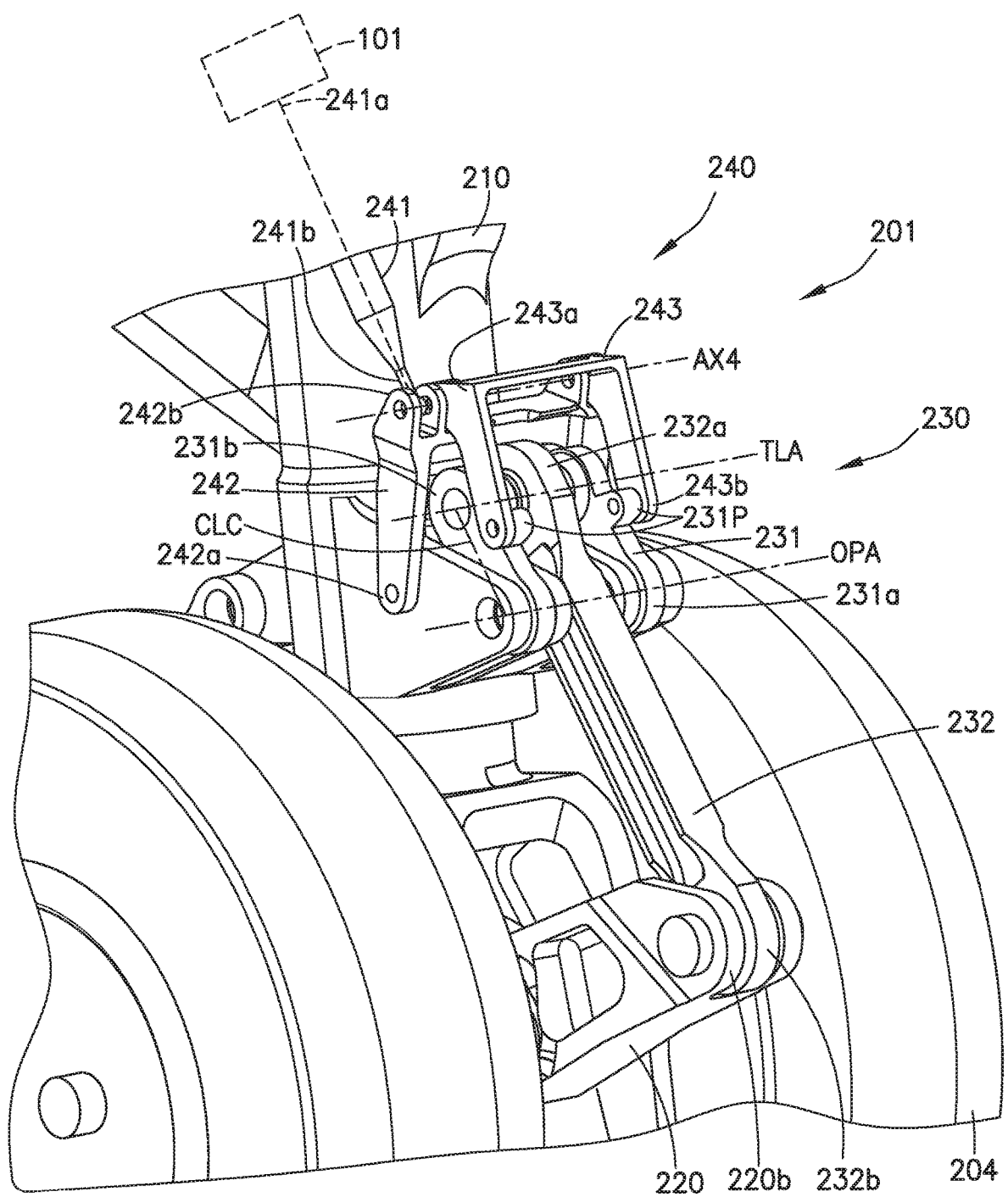
Figure 4:
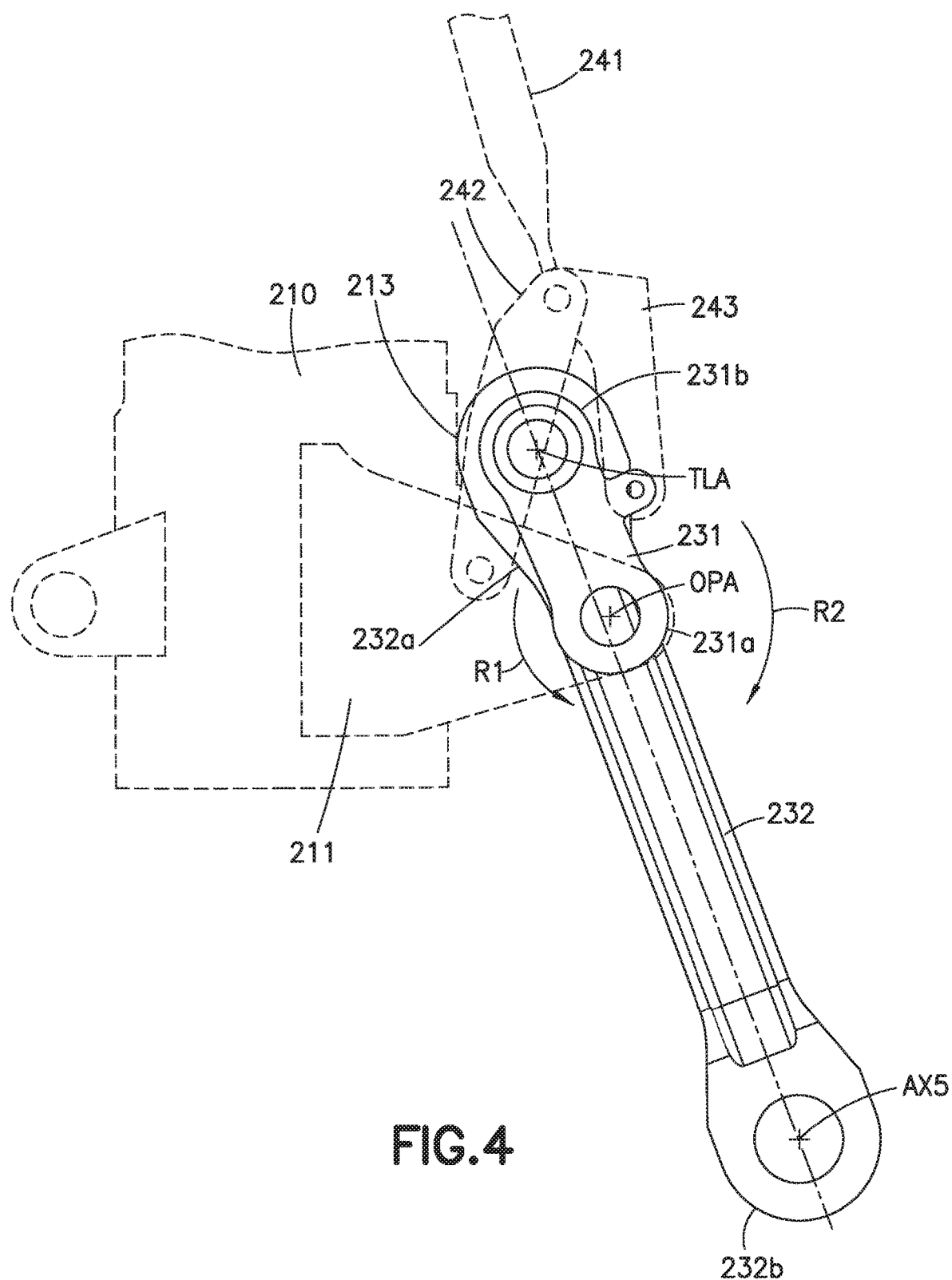
Figure 5:
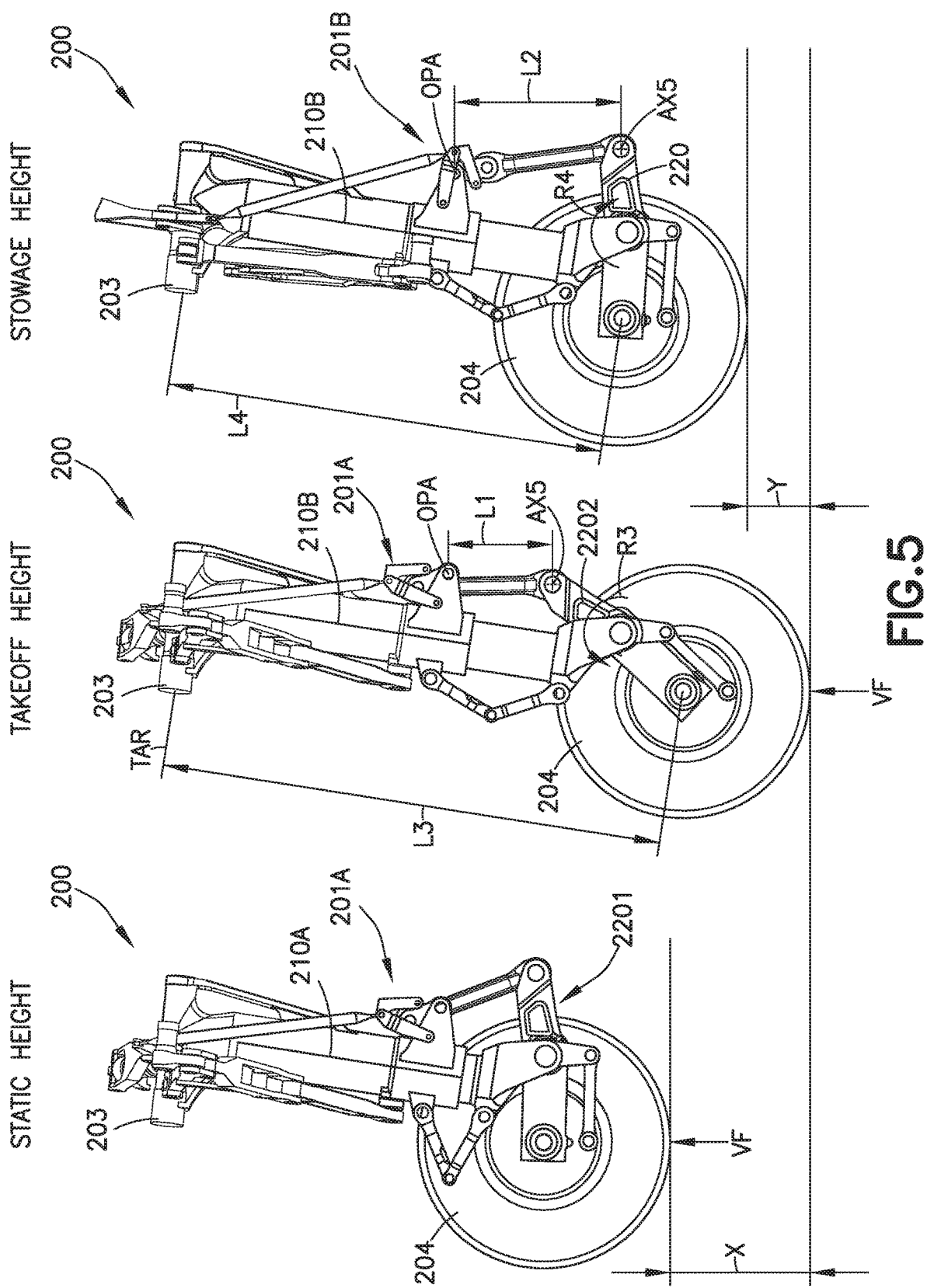
Figure 6:
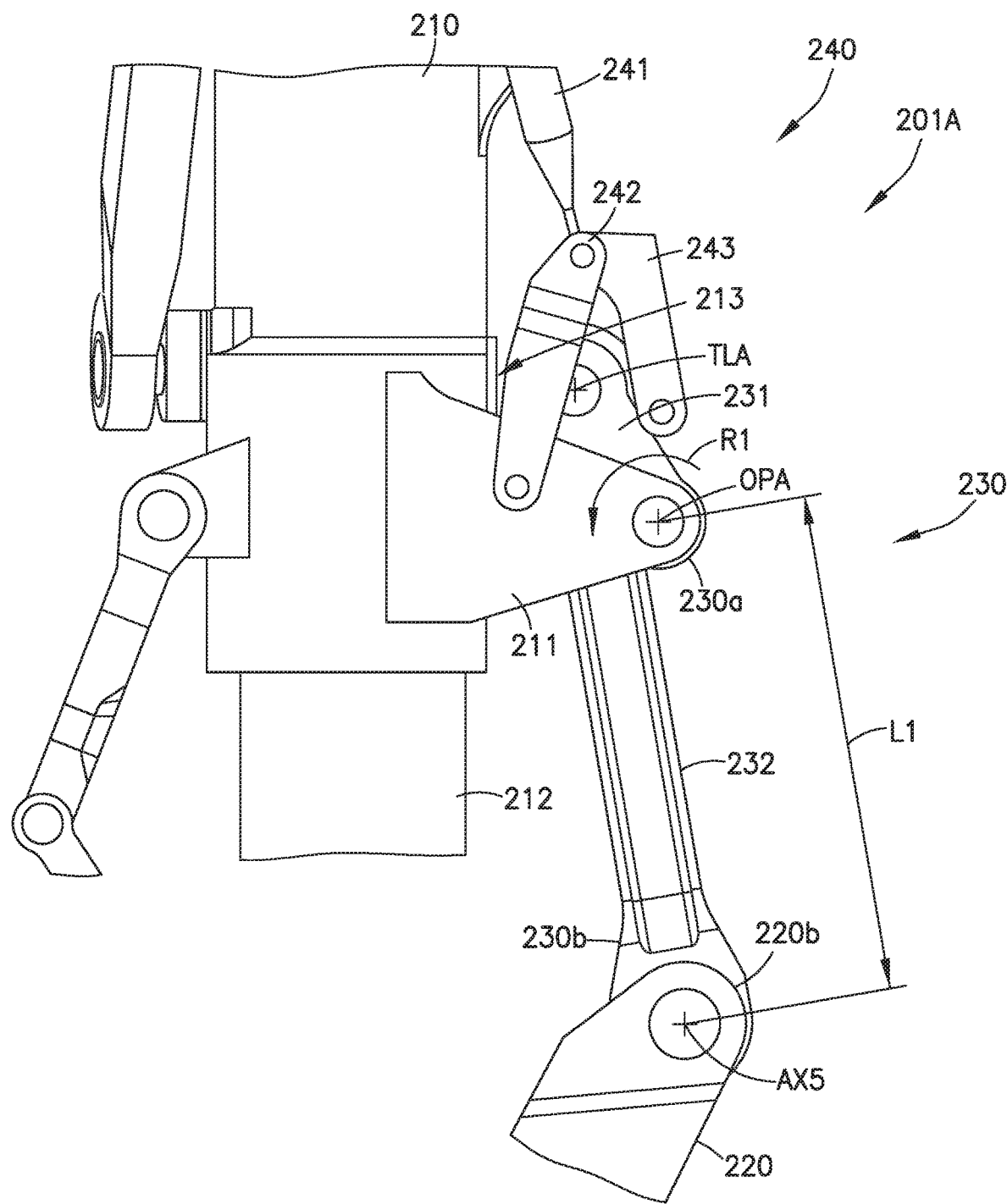
Figure 7:
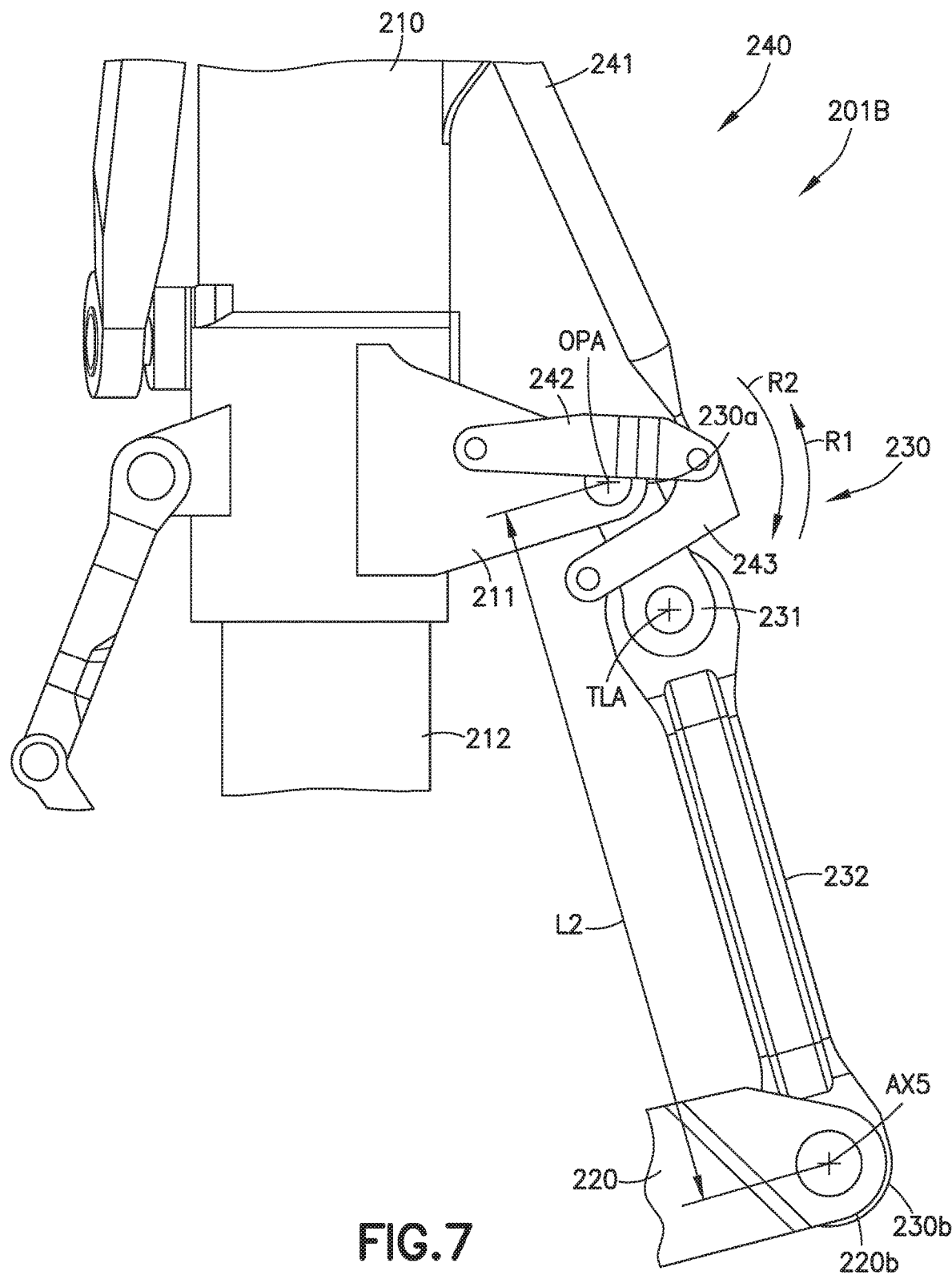
Figure 8:
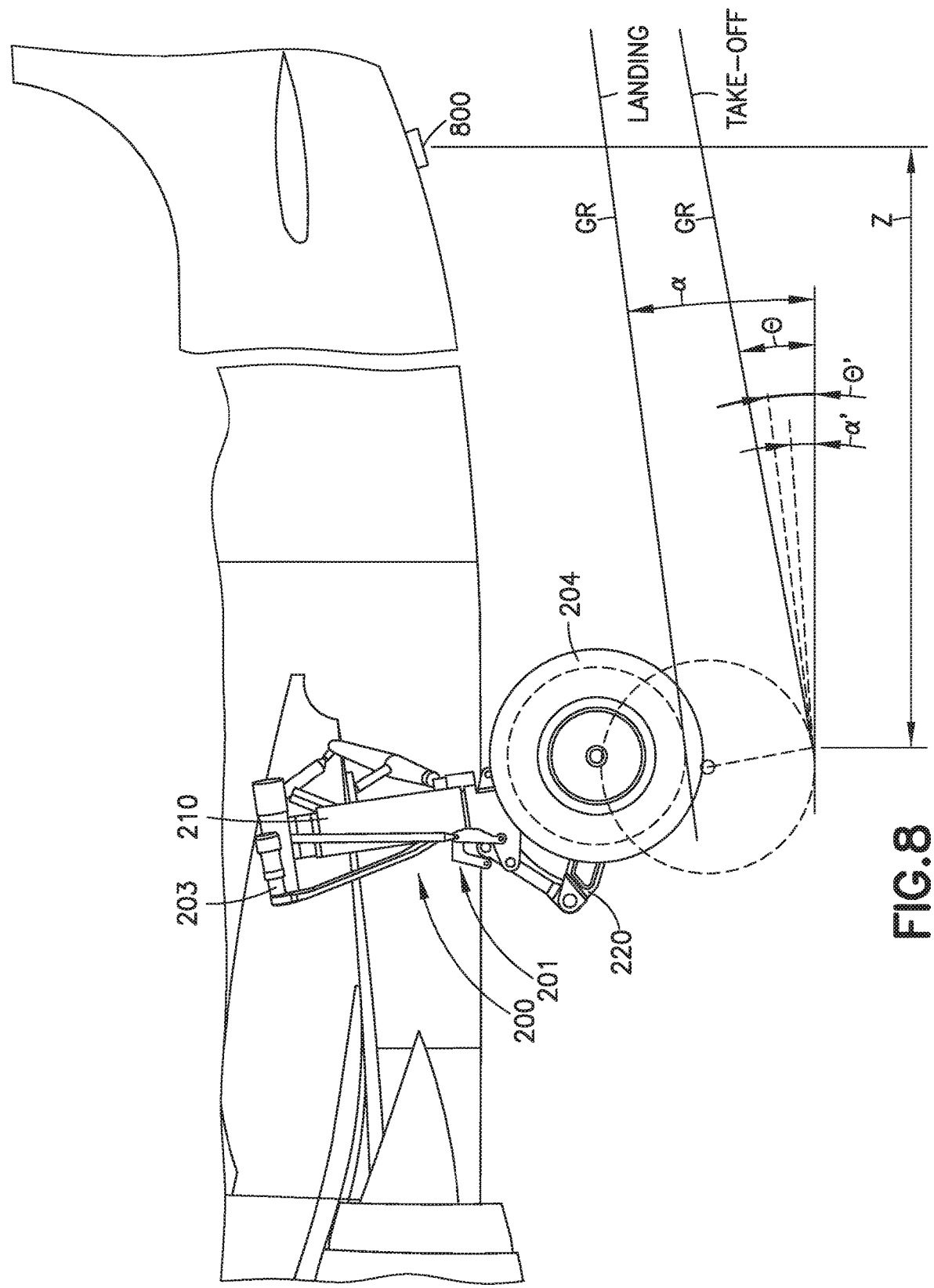
Figure 9:
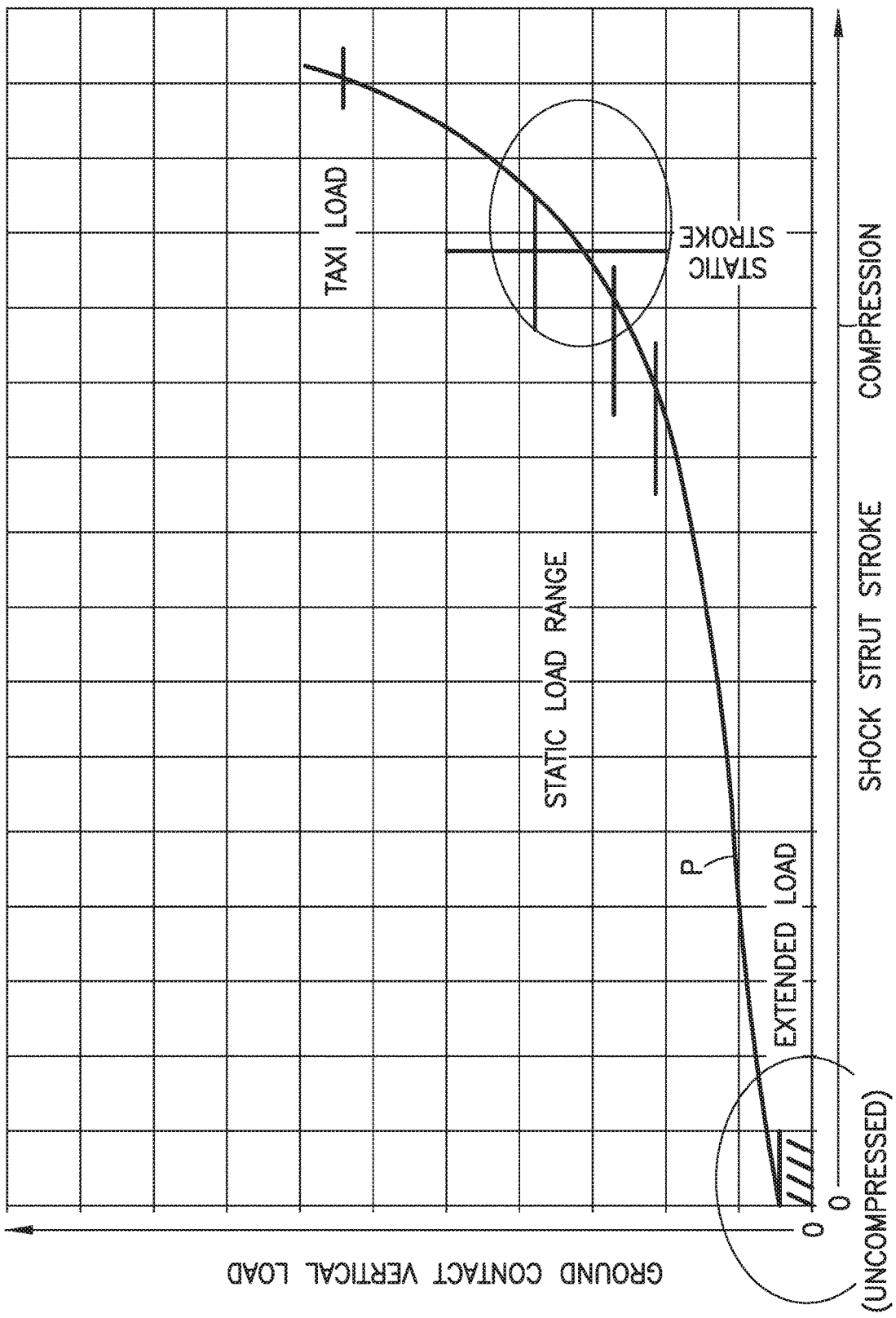
Figure 10:
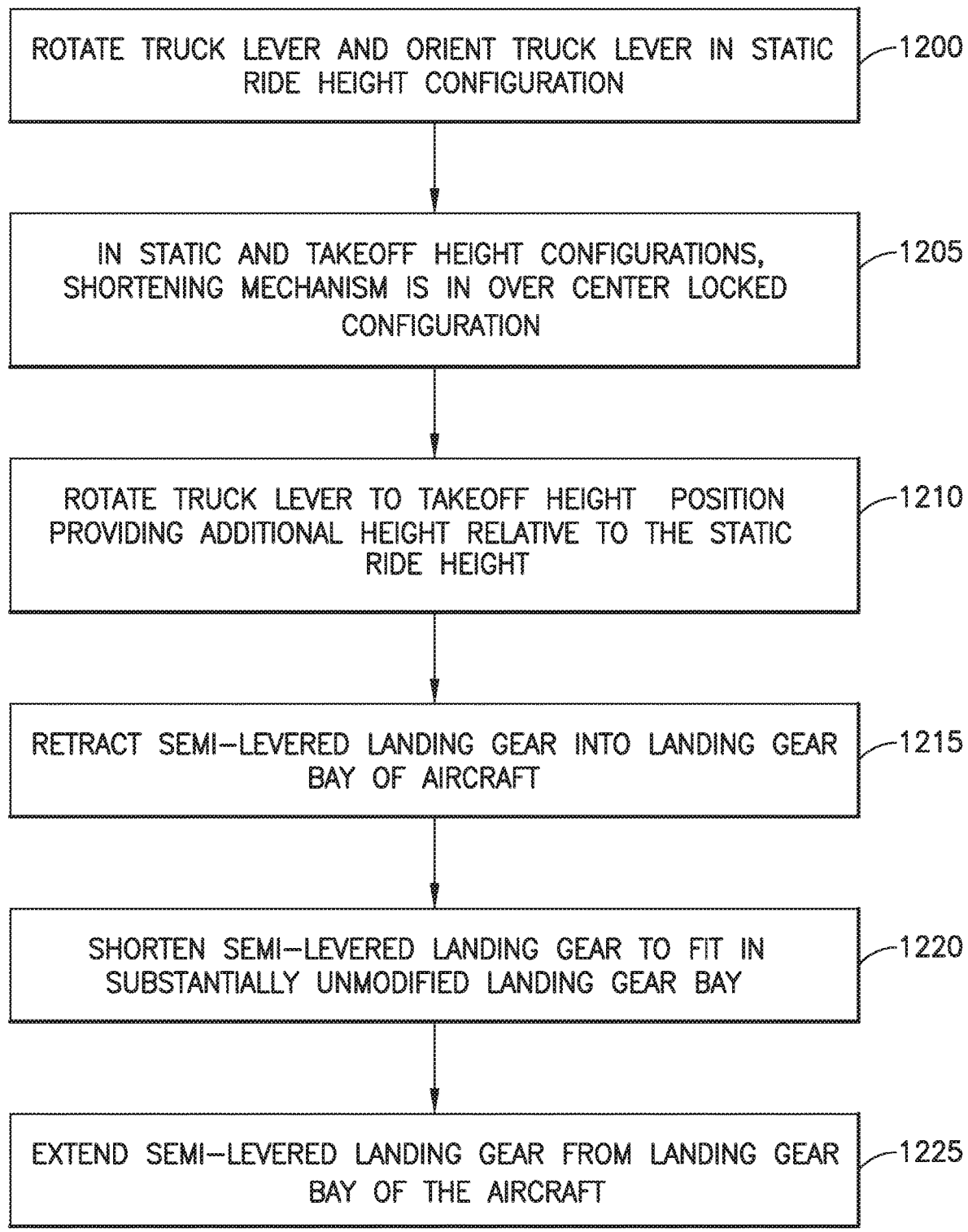

Having thus described examples of the present disclosure in general terms, reference will now be made to the accompanying drawings, which are not necessarily drawn to scale, and wherein like reference characters designate the same or similar parts throughout the several views, and wherein:

FIGS. 1A-1C are schematic illustrations of an aircraft and semi-levered landing gear in accordance with one or more aspects of the present disclosure;

FIG. 2 is a schematic illustration of the semi-levered landing gear in accordance with one or more aspects of the present disclosure;

FIG. 3 is a schematic illustration of a portion of the semi-levered landing gear in accordance with one or more aspects of the present disclosure;

FIG. 4 is a schematic illustration of a portion of the semi-levered landing gear in accordance with one or more aspects of the present disclosure;

FIG. 5 is a schematic illustration of the semi-levered landing gear in a static height configuration, a takeoff height configuration and a stowage configuration in accordance with one or more aspects of the present disclosure;

FIG. 6 is a schematic illustration of a portion of the semi-levered landing gear in accordance with one or more aspects of the present disclosure;

FIG. 7 is a schematic illustration of a portion of the semi-levered landing gear in accordance with one or more aspects of the present disclosure;

FIG. 8 is a schematic illustration of the aircraft and the semi-levered landing gear in accordance with one or more aspects of the present disclosure;

FIG. 9 is graph illustrating the ground contact vertical load of the semi-levered landing gear versus the shock strut stroke of the semi-levered landing gear in accordance with one or more aspects of the present disclosure; and FIG. 10 is a flowchart of a method for operating the semi-levered landing gear shown in FIGS. 1 to 8.

DETAILED DESCRIPTION

In order to achieve a greater angle of attack/rotation of the aircraft on takeoff and/or landing, maintain current static ride heights and current attachment locations of a conventional landing gear, without having to redesign the aircraft, the semi-levered landing gear described herein increases height of the aircraft during takeoff and shortens a length of the landing gear in a stowing position following takeoff for stowage in the current landing gear bay with little to no modification of the aircraft. In particular, the semi-levered landing gear described herein is both weight and cost efficient and is not overly complex, while still satisfying the static height, takeoff and/or landing height and stowage requirements of the semi-levered landing gear.

The embodiments described herein provide a single axle, semi-levered landing gear with a pivoting truck link and a landing gear length shortening mechanism which generally has a simple configuration that provides a low static ride height of the aircraft, a tall takeoff height of the aircraft and a shortened landing gear length for stowage of the landing gear within the aircraft.

Illustrative, non-exhaustive examples, which may or may not be claimed, of the subject matter according to the present disclosure are provided below.

Referring to FIGS. 1A-1C and 2 an exemplary aircraft 100 and semi-levered landing gear 200 (also referred to herein as a shock strut assembly) with a shortening mechanism 201 (also referred to herein as a shrink mechanism) is illustrated incorporating aspects of the present disclosure.

In one aspect, while the semi-levered landing gear 200 described herein is described with respect to a commercial passenger jet, referred to herein as the aircraft 100, in other aspects the aircraft may be any suitable aircraft having a fixed wing or variable sweep wing The semi-levered landing gear 200 may also be used in landing gear having any suitable position on the aircraft 100, such as landing gear 200A, which may be a main landing gear, located towards a longitudinal center of the aircraft 100, or in other aspects a nose landing gear 200B located towards a longitudinal front of the aircraft 100. As will be described herein, the semi-levered landing gear 200 is configured to couple to one or more of the airframe 101 and the landing gear components (e.g., a landing gear hydraulic actuator, landing gear extension/retraction mechanisms/linkages, etc.) of the aircraft 100 for providing the low static ride height, the tall take-off height and the shortened length for retraction of the semi-levered landing gear 200.

Referring to FIGS. 1B and 1C, the semi-levered landing gear 200 is illustrated in an extended and stowed position. A conventional single axle landing gear 102 is also illustrated for comparison of the landing gear attachment locations relative to the airframe 101 of the aircraft 100. In one aspect, the semi-levered landing gear 200 provides the same static ride height A (e.g. the distance from the ground to the lowest point on the aircraft 100 such as the bottom of the fuselage 100F) as the conventional single axle landing gear 102 while being coupled to the airframe 101 further inboard, relative to the centerline CL of the fuselage 100F, by a predetermined distance B. As can be seen best in FIG. 1B, upon retraction, the location of the landing gear wheel(s) 204 and wheel axis WA are located at a common location (e.g. within the wheel compartment of the aircraft 100 with little to no modification of the wheel bay) as illustrated by the retraction path 102A of the conventional single axle landing gear 102 and the retraction path 200R of the semi-levered landing gear 200. As such, the semi-levered landing gear 200 may be fit to an aircraft while maintaining the existing conventional landing gear bay of the aircraft, sill waterlines, etc., i.e., the aircraft 100 does not have to be redesigned in order to accommodate the semi-levered landing gear 200 and receive the increased takeoff and/or landing height and aircraft rotation benefits of the semi-levered landing gear 200.

The semi-levered landing gear 200 in accordance with the aspects of the present disclosure provides for a landing gear system with less complexity when compared to other, conventional landing gear shortening designs (such as hydraulics that compress the shock strut upon retraction and stowage of the landing gear), reduced weight compared to conventional landing gear shortening designs, and contains less stored energy than conventional landing gear shortening designs that perform the same or similar function (e.g., shortening the landing gear for retraction into the aircraft). For example, the semi-levered landing gear 200 can be shortened for stowage within the aircraft without compression of the shock strut 210 of the semi-levered landing gear 200.

Referring to FIGS. 2 and 3, in one aspect and as noted above, the semi-levered landing gear 200 is a single axle landing gear that includes a shock strut 210, a truck lever 220, a tension link assembly 230, and a positioning mechanism 240 (the tension link assembly 230 coupled to the positioning mechanism 240 is also referred to hereinafter as a shortening mechanism 201). In one aspect, the semi-levered landing gear 200 includes at least one wheel 204. In one aspect, the at least one wheel 204 is disposed on a common (e.g. single) axle of the semi-levered landing gear. For example, in one aspect, the at least one wheel 204 includes two or more wheels disposed on the common axle. In one aspect, the semi-levered landing gear 200 also includes a trunnion 203 coupled to the shock strut 210 where the trunnion 203 is pivotally coupled to the airframe 101 (see FIG. 1C) so that the semi-levered landing gear 200 pivots about a trunnion axis of rotation TAR between a landing gear stowed position and a landing gear extended position. In one aspect, any suitable hydraulics and actuation mechanisms/ linkage may be coupled to semi-levered landing gear 200 for actuation of the semi-levered landing gear 200. In one aspect, the landing gear actuation mechanism includes a retraction mechanism 202 to which the shortening mechanism 201 is coupled as described herein.

In one aspect, the shock strut 210 includes an outer cylinder 211 and an inner cylinder 212 that is movable relative to the outer cylinder 211. In one aspect, the shock strut 210 may be gas over oil shock, while in other aspects the shock strut 210 may include any suitable dampening/ rebound mechanism. In one aspect, the inner cylinder 212 moves relative to the outer cylinder 211 to compress and un-compress/extend the shock strut 210 under, e.g., the weight of the aircraft 100. In one aspect, the shock strut 210 also includes a rotation stop 213 that interacts with the shortening mechanism 201 as described herein. In one aspect, the rotation stop 213 is the outer cylinder 211 while in other aspects the rotation stop 213 may be coupled to the outer cylinder 211 in any suitable manner. In one aspect, the rotation stop 213 is of unitary one piece construction with the outer cylinder 211 of the shock strut 210. In one aspect, as noted above, trunnion 203 is coupled to the outer cylinder 211 of the shock strut 210 so that the outer cylinder 211 is coupled to the airframe 101 of the aircraft 100 In one aspect, the outer cylinder 211 of the shock strut 210 and the trunnion 203 are formed as a unitary one piece member.

Still referring to FIGS. 2 and 3, in one aspect, the truck lever 220 has a truck lever first end 220a and a truck lever second end 220b longitudinally spaced from the truck lever first end 220a. In one aspect, the truck lever 220 is a rigid member, i.e., there are no articulated joints between the truck lever first end 220a and the truck lever second end 220b. In one aspect, the truck lever 220 comprises a monolithic member. In one aspect, the truck lever 220 is pivotally coupled to the inner cylinder 212 about a truck pivot axis of rotation TPA disposed between the truck lever first end 220a and the truck lever second end 220b. In one aspect, as noted above, the truck lever 220 includes but one wheel axis WA that is disposed proximate the truck lever first end 220a between the truck lever first end 220a and the truck pivot axis of rotation TPA. In one aspect, the shock strut 210 is substantially uncompressed with the truck lever 220 at the truck lever extended position (see e.g. the takeoff height configuration illustrated in FIG. 5). In one aspect, the shock strut 210 is substantially uncompressed with the truck lever 220 at the truck lever stowed position (see e.g. the stowage height configuration illustrated in FIG. 5).

Still referring to FIGS. 2 and 3, the shortening mechanism 201 includes a tension link assembly 230 and a positioning mechanism 240. In one aspect, the tension link assembly 230 includes a tension link assembly first end 230a, a tension link assembly second end 230b, and at least one tension link assembly rotation axis TLA disposed between the tension link assembly first end 230a and the tension link assembly second end 230b. In one aspect, the tension link assembly 230 is coupled to both the truck lever 220 and the shock strut 210. For example, in one aspect, the tension link assembly first end 230a is rotatably coupled to the outer cylinder 211 of the shock strut 210 in any suitable manner such as about an over-center pivot axis OPA. In one aspect, the tension link assembly 230 is configured so that the truck lever 220 rotates about the truck pivot axis of rotation TPA during compression and rebound of the shock strut 210 to provide for normal operation (e.g. the compression and rebound) of the shock strut as well as to provide the increased takeoff height of the aircraft 100. The tension link assembly 230 is also configured so that the truck lever 220 rotates about the truck pivot axis of rotation TPA to the stowed configuration (see FIG. 5) upon retraction and stowage of the semi-levered landing gear 200.

Referring to FIGS. 2, 3 and 4, in one aspect, the tension link assembly 230 includes an over-center link 231 (also referred to herein a first shrink link member) and a truck link 232 (also referred to herein as a second shrink link member). In one aspect, the tension link assembly 230 may include any suitable number of links. The over-center link 231 includes an over-center link first end 231a and an over-center link second end 231b longitudinally spaced from the over-center link first end 231a. In one aspect, the over-center link first end 231a defines the tension link assembly first end 230a and is rotatably coupled to the shock strut 210 about the over-center pivot axis OPA in any suitable manner.

In one aspect, the truck link 232 includes a truck link first end 232a and a truck link second end 232b longitudinally spaced from the truck link first end 232a. In one aspect, the truck link first end 232a is rotatably coupled to the over-center link second end 231b about the tension link assembly rotation axis TLA so that the truck link 232 and the over-center link 231 are configured to fold and unfold relative to each other about the tension link assembly rotation axis TLA. In one aspect, the truck link second end 232b defines the tension link assembly second end 230b and is rotatably coupled to the truck lever second end 220b in any suitable manner about axis AX5. The truck link second end 232b is rotatably coupled to the truck lever second end 220b such that the truck link 232 and the truck lever 220 fold and unfold relative to each other. The truck link 232 folding and unfolding relative to the truck lever 220 rotates the truck lever 220 about the truck pivot axis of rotation TPA between a truck lever extended position and a truck lever stowed position and to provide operation of the semi-levered landing gear 200 such as during compression and rebound of the shock strut 210. With the truck link 232 folded relative to the truck lever 220, the tension link assembly 230 is at a shortest length (as will be further described below) rotating the truck lever such that the at least one wheel 204 is further away from the trunnion axis of rotation TAR (i.e., during compression and rebound). With the truck link 232 unfolded relative to the truck lever 220, the tension link assembly 230 is at a longest length (as will be further described below) rotating the truck lever 220 such that the at least one wheel 204 is closer to the trunnion axis of rotation (i.e., stowed). The truck link 232 is configured to provide a tension load to resist a moment M that rotates the truck lever 220 about the truck pivot axis of rotation TPA created by a vertical force VF applied to the at least one wheel 204 by the ground, where the inner cylinder 212 provides an opposing a force VF1 to the at least one wheel 204 that opposes the vertical force VF.

Referring again to FIG. 2, in one aspect, the positioning mechanism 240 includes a number of links coupled to one or more of the shock strut 210, the airframe 101 and the tension link assembly 230. The positioning mechanism 240 is provided to lock or unlock, as will be described further herein, the tension link assembly 230 where, when locked, the tension link assembly 230 resists the moment M applied to the truck lever 220 about the truck pivot axis of rotation TPA and where unlocked the truck lever 220 is positioned for stowage of the semi-levered landing gear 200 in the landing gear bay of the aircraft 100. In one aspect, the number of links of the positioning mechanism 240 mechanically slave the orientation of the tension link assembly 230 to the extension and retraction of the semi-levered landing gear 200 from and to its stowed position within the landing gear bay of the aircraft 100. In one aspect, the positioning mechanism 240 may not be mechanically slaved to the extension and retraction of the semi-levered landing gear 200 from and to its stowed position within the landing gear bay of the aircraft 100. For example, here the positioning mechanism 240 may include a linear actuator coupled to the outer cylinder 211 and the over-center link 231. In one aspect, the linear actuator is one of a hydraulic ram, a pneumatic ram, a ball screw actuator, or a solenoid. In one aspect, the linear actuator is any suitable type of actuator. In one aspect, the positioning mechanism 240 may include a circular rotation actuator coupled to the outer cylinder 211 and the over-center link 231. In one aspect, the circular rotation actuator is one of a stepper motor or an electric motor. In one aspect, the circular rotation actuator is any suitable circular rotation actuator.

Referring to FIGS. 2, 3 and 4, in one aspect, the number of links of the positioning mechanism 240 includes a connecting link 241 (also referred to herein as a drive member), a first pivot link 242 (also referred to herein as a pivot arm), and a second pivot link 243 (also referred to herein as a driven member). The connecting link 241 includes a connecting link first end 241a and a connecting link second end 241b. In one aspect, the connecting link 241 is a rigid link (e.g. unarticulated so that there are no articulated joints between the connecting link first and second ends 241a, 241b). In one aspect, the connecting link first end 241a is coupled to the airframe 101 of the aircraft 100 such as by rotatably coupling the connecting link first end 241a to the retraction mechanism 202 so that the positioning of the truck lever 220 by the shortening mechanism 201 is mechanically slaved to the extension and retraction of the semi-levered landing gear 200 to and from the landing gear bay of the aircraft 100. In one aspect, where the positioning of the truck lever 220 is not mechanically slaved, the connecting link first end 241a may be coupled to the shock strut 210, such as to the outer cylinder 211 and be in the form of a linear actuator as described above. In one aspect, the connecting link second end 241b is coupled to the first pivot link 242 or the second pivot link 243 about axis AX4.

In one aspect, the first pivot link 242 includes a first end 242a and a second end 242b longitudinally spaced from the first end 242a. The first end 242a of the first pivot link 242 is rotatably coupled to the shock strut 210, such as to the outer cylinder 211, in any suitable manner. In one aspect, the connecting link second end 241b is coupled to the second end 242b of the first pivot link 242 about the axis AX4.

In one aspect, the second pivot link 243 includes a first end 243a and a second end 243b longitudinally spaced from the first end 243a. The first end 243a of the second pivot link 243 is rotatably coupled to the second end 242b of the first pivot link 242 about axis AX4. In one aspect, the connecting link second end 241b is coupled to the first end 243a of the second pivot link 243 about axis AX4. The first pivot link 242 and the second pivot link 243 fold and unfold relative to each other. The second end 243b of the second pivot link 243 is rotatably coupled to the over-center link 231 proximate the over-center link second end 231b so that folding and unfolding of the first pivot link 242 relative to the second pivot link 243, caused by connecting link 241, rotates the tension link assembly rotation axis TLA in direction R1, R2 about the over-center pivot axis OPA to lock and unlock the tension link assembly 230. In one aspect, the over-center link 231 includes one or more protrusions 231P (also referred to herein as lever members) that extend laterally away from a centerline CLC of the over-center link 231 in a direction away from the shock strut 210. The second end 243b of the second pivot link 243 is coupled to the one or more protrusions 231P so that force applied by the second pivot link 243 to the over-center link 231 is applied off-center relative to the over-center pivot axis OPA so that a moment is produced about the over-center pivot axis OPA for rotating the tension link assembly rotation axis TLA in direction R1, R2 about the over-center pivot axis OPA to lock and unlock the tension link assembly 230.

Referring now to FIGS. 2-7, operation of the semi-levered landing gear 200 will now be described with respect to the aircraft 100. As can be seen best in FIG. 5, as the weight of the aircraft 100 rests on the semi-levered landing gear 200, the shock strut 210 is in a statically compressed state (noting that there remains travel within the shock strut to cushion the aircraft 100 for dynamic loading during taxi), hereafter referred to as the statically compressed shock strut 210A. With the statically compressed shock strut 210A in the statically compressed state the truck lever 220 is rotated about the truck pivot axis of rotation TPA so that the truck lever 220 is oriented in a static ride height configuration, hereinafter the static ride height truck lever 2201, to provide the aircraft 100 with the static ride height A (FIG. 10, Block 1200). As described above, with the static ride height truck lever 2201 at the static ride height configuration the aircraft 100 is provided with a static ride height A that is the same as the static ride height A of the aircraft 100 when equipped with conventional single axle landing gear 102.

Here, with the semi-levered landing gear 200 in the static height and takeoff height configurations, as illustrated in FIG. 5, the shortening mechanism 201 is in an over center locked configuration 201A, e.g., the over-center link second end 231b of the over-center link 231 is held against the rotation stop 213 of the outer cylinder 211 in direction R1 by the tension forces acting on truck link 232 due to, for example, the vertical force VF acting upon the semi-levered landing gear 200 (FIG. 10, Block 1205). In the over center locked configuration 201A, the tension link assembly 230 is able to react the tension load to the outer cylinder 211 of the statically compressed shock strut 210A through the rotation stop 213 and the point at which the over-center link 231 couples to the outer cylinder 211 of the statically compressed shock strut 210A. The tension load tends to rotate the over-center link 231 about the over-center pivot axis OPA in the rotation direction R1 toward the rotation stop 213 on the outer cylinder 211 of the statically compressed shock strut 210A because the line of action of the tension load, through the truck link 232, in the over center locked configuration 201A is between the rotation stop 213 and the over-center pivot axis OPA of the over-center link 231. As such, the tension load and resulting moments on the tension link assembly 230 are isolated from the positioning mechanism 240.

As the aircraft 100 accelerates down the runway, the wings create lift. The lift created reduces the portion of the weight of the aircraft 100 applied to the semi-levered landing gear 200. The reduction in weight applied to the semi-levered landing gear 200 causes the shock strut 210 to extend or uncompress. Movement of the inner cylinder 212 of the shock strut 210 relative to the outer cylinder 211 during extension causes the static ride height truck lever 2201 to rotate to a takeoff height position, referred to as extended truck lever 2202, as seen best in FIG. 5 which provides the aircraft 100 with additional height X relative to the static ride height A of the aircraft 100 (e.g. the static ride height A is increased by height X at the takeoff height) (FIG. 10, Block 1210). The additional height X, which is greater than the amount of extension provided by the shock strut 210, provides for a predetermined angle of rotation θ of the aircraft 100 relative to the ground GR, as seen in FIG. 8, upon takeoff and provides for a predetermined angle of rotation α (e.g. angle of attack) of the aircraft 100 relative to ground GR upon landing. Here the angles of rotation θ, α are increased compared to takeoff and landing angles of rotation θ', α' of the aircraft 100 when equipped with conventional single axle landing gear 102 where wheel travel is limited only by an amount of travel of the shock strut and the distance Z between the ground contact patch of the wheel(s) 204 and a tail skid pad 800 of the aircraft remains the same for the aircraft 100.

The statically compressed shock strut 210A generally un-compresses until the at least one wheel 204 is off the ground, i.e., the vertical force VF is no longer acting upon the semi-levered landing gear 200. As the statically compressed shock strut 210A un-compresses, the shortening mechanism 201 remains in the over center locked configuration 201A and, as described above, causes the truck lever 220 to pivot about the truck pivot axis of rotation TPA in the rotation direction R3 to, at least, the truck lever extended position. The pivot of the truck lever 220 about the truck pivot axis of rotation TPA in the rotation direction R3 provides a predetermined amount of ground contact vertical load so that the aircraft 100 rotates to the rotation angle. In one aspect, the semi-levered landing gear 200 with an uncompressed shock strut 210B and the shortening mechanism 201 in the over center locked configuration 201A with an extended truck lever 2202, results in a first length L1 between the over-center link first end 231a (e.g. over-center pivot axis OPA) and the truck link second end 232b (e.g. axis AX5) which provides a predetermined distance L3 between the but one wheel axle WA and the trunnion 203 (e.g. the trunnion axis of rotation TAR where the semi-levered landing gear 200 is coupled to the airframe 101) that results in a larger amount of wheel travel during takeoff when compared to the conventional single axle landing gear 102. The extended wheel travel provided by the distance L3 between the but one wheel axle WA and the trunnion axis of rotation TAR provides the aircraft 100 with an increased takeoff height (compared to the takeoff height of the conventional single axle landing gear 102 whose travel is limited solely by the extension of the shock strut) and an increased angle of rotation θ (e.g. angle of attack), again compared to conventional single axle landing gear 102, illustrated in FIG. 1B.

After taking off, the semi-levered landing gear 200 is retracted into the landing gear bay of the aircraft 100 (FIG. 10, Block 1215). As the weight of the aircraft 100 is no longer acting upon the semi-levered landing gear 200, the shock strut 210B is uncompressed (e.g. without any vertical load VF acting on the semi-levered landing gear 200). The uncompressed shock strut 210B pivots about the trunnion axis of rotation TAR of the trunnion 203 towards the shock strut stowed position illustrated in FIGS. 1B and 1C. In order to stow the semi-levered landing gear 200, as the uncompressed shock strut 210B pivots about the trunnion axis of rotation TAR the semi-levered landing gear 200 is shortened to fit in the substantially unmodified landing gear bay (FIG. 10, Block 1220). For example, the tension link assembly 230 is moved from an over center locked configuration 201A to an unlocked configuration 201B. In one aspect, the over-center link 231 is rotated by the positioning mechanism 240 from the locked position to the unlocked position, i.e., the over-center link 231 is rotated, by for example, the connecting link 241 away from the rotation stop 213 in rotation direction R2 about the over-center pivot axis OPA until the distance between the tension link assembly first end 230a and the tension link assembly second end 230b is a second length L2. Generally, the first length L1 is shorter than the second length L2. The second length L2 causes the distance between the but one wheel axle WA and the trunnion axis of rotation TAR to be decreased from about distance L3 to distance L4. The distance L4 between the but one wheel axle WA and the trunnion axis of rotation TAR places the truck lever 220 in a stowed configuration for the landing gear to be stowed into, for example, the existing landing gear bay within the aircraft 100 with little to no modification of the landing gear bay.

As noted above, the rotation of the over-center link 231 from locked position to unlocked position is controlled by the positioning mechanism 240. In order to change the orientation of the over-center link 231 from locked position to unlocked position, the positioning mechanism 240, for example, pushes or actuates the truck link first end 232a in rotation direction R2. In one aspect, as described above, the positioning mechanism 240 is mechanically slaved to the retraction of the semi-levered landing gear 200 into the landing gear bay of the aircraft 100 while in other aspects the positioning mechanism 240 is actuated independent of the retraction of the semi-levered landing gear into the landing gear bay of the aircraft 100. As the truck link first end 232a and the over-center link second end 231b are coupled about the tension link assembly rotation axis TLA, the over-center link second end 231b is also pushed or actuated in rotation direction R2 about the over-center pivot axis OPA. As the truck link first end 232a and the over-center link second end 231b rotate in direction R2, the truck lever 220 is rotated about the truck pivot axis of rotation TPA in rotation direction R4 to the truck lever stowed position, as illustrated in FIG. 5, which shortens the semi-levered landing gear 200 a distance Y relative to the semi-levered landing gear 200 with a substantially uncompressed shock strut 210B and with the shortening mechanism 201 in the over center locked configuration 201A with an extended truck lever 2202. Shortening the semi-levered landing gear 200 through rotation of the truck lever 220 about the truck pivot axis of rotation TPA in rotation direction R4 to the truck lever stowed position provides for positioning of the trunnion axis of rotation TAR closer to the centerline CL of the aircraft 100 compared to an aircraft having a conventional single axle shock strut 102 with the same uncompressed length at stowage as illustrated in FIGS. 1B and 1C.

Upon aircraft 100 approach for landing, the semi-levered landing gear 200 is extended from the landing gear bay of the aircraft 100 (FIG. 10, Block 1225). The uncompressed shock strut 210B pivots about the trunnion axis of rotation TAR of the trunnion 203 towards the shock strut extended position. As the uncompressed shock strut 210B pivots the about the trunnion axis of rotation TAR, the truck lever 220 of the semi-levered landing gear 200 extends the distance Y in a manner substantially opposite to that described above with respect to the retraction of the semi-levered landing gear 200 to the stowed configuration within the landing gear bay of the aircraft 100. For example, the positioning mechanism 240 pulls or actuates the truck link first end 232a in rotation direction R1. As the truck link first end 232a and the over-center link second end 231b are coupled about the tension link assembly rotation axis TLA, the over-center link second end 231b is also pulled or actuated in rotation direction R1 about the over-center pivot axis OPA. As the truck link first end 232a and the over-center link second end 231b rotate in direction R1, the truck lever 220 is rotated about the truck pivot axis of rotation TPA in rotation direction R3 to the extended truck lever position, as illustrated in FIGS. 2 and 5

Referring now to FIG. 9, a graph for the semi-levered landing gear 200 is illustrated showing the ground contact vertical load (e.g. VF) versus the shock strut stroke. It is noted that the shock strut stroke in FIG. 9 is measured from the extended configuration of the shock strut 210 so that as the shock strut is compressed the ground contact vertical load is increased. As is known in the art, in order for an aircraft to take off, there must be enough force translation through the wheel(s) 204 into the aircraft 100 for the aircraft 100 to pivot about the wheel(s) 204 for takeoff and landing. As the shock strut 210 of the semi-levered landing gear 200 extends or un-compresses during takeoff, the ground contact vertical load decreases. However, as can be seen by the curve P in FIG. 9 there is sufficient ground contact vertical force translating through the wheels 204 with the shock strut 210 uncompressed and the truck lever 220 extended (e.g. the extended load region of the curve P) to get a reaction between the ground and the semi-levered landing gear 200 to create a moment for the aircraft 100 to pivot, noting that as the shock strut stroke increases the compression of the shock strut increases (as shown in FIG. 9).

The following are provided in accordance with the aspects of the present disclosure:

A1. A semi-levered landing gear comprising:

a shock strut, having an inner cylinder and an outer cylinder, the shock strut configured for coupling to an airframe of an aircraft;

a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end;

a tension link assembly having a tension link assembly first end, a tension link assembly second end, and at least one tension link assembly rotation axis disposed between the tension link assembly first end and the tension link assembly second end, the tension link assembly first end being coupled to the shock strut outer cylinder, and the tension link assembly second end being coupled to the truck lever second end; and a positioning mechanism being configured for coupling to one or more of the airframe and the shock strut and being coupled to the tension link assembly proximate the tension link assembly first end;

wherein the tension link assembly is configured to rotate the truck lever about the truck pivot axis of rotation between a truck lever extended position and a truck lever stowed position.

A2. The semi-levered landing gear of paragraph A1, wherein the shock strut is substantially uncompressed with the truck lever at the truck lever extended position and with the truck lever at the truck lever stowed position.

A3. The semi-levered landing gear of paragraph A1, wherein the tension link assembly is configured so that the truck lever rotates about the truck pivot axis of rotation during compression of the shock strut.

A4. The semi-levered landing gear of paragraph A1, wherein the tension link assembly comprises:

an over-center link having an over-center link first end and an over-center link second end longitudinally spaced from the over-center link first end, the over-center link first end defining the tension link assembly first end and being rotatably coupled to the shock strut about an over-center pivot axis; and a truck link having a truck link first end and a truck link second end longitudinally spaced from the truck link first end, the truck link first end being rotatably coupled to the over-center link second end about the tension link assembly rotation axis and the truck link second end defining the tension link assembly second end and being rotatably coupled to the truck lever second end.

A5. The semi-levered landing gear of paragraph A4, wherein the positioning mechanism comprises:

a connecting link having a connecting link first end and a connecting link second end, the connecting link first end being configured for coupling to one or more of the airframe and the shock strut;

a first pivot link having a first end and a second end longitudinally spaced from the first end, the first end of the first pivot link being rotatably coupled to the shock strut; and a second pivot link having a first end and a second end longitudinally spaced from the first end, the first end of the second pivot link being rotatably coupled to the second end of the first pivot link;

wherein the connecting link second end is coupled to at least one of proximate the second end of the first pivot link and proximate the first end of the second pivot link.

A6. The semi-levered landing gear of paragraph A5, wherein:

the second end of the second pivot link is rotatably coupled to the over-center link proximate the over-center link second end so that movement of the connecting link causes rotation of the truck link first end about the over-center pivot axis.

A7. The semi-levered landing gear of paragraph A5, wherein the connecting link comprises a linear actuator and the connecting link first end is coupled to the shock strut or the airframe.

A8. The semi-levered landing gear of paragraph A5, wherein the connecting link comprises a hydraulic actuator and the connecting link first end is coupled to the shock strut or the airframe.

A9. The semi-levered landing gear of paragraph A5, wherein the connecting link is a rigid unarticulated link.

A10. The semi-levered landing gear of paragraph A1, further comprising:

a retraction mechanism coupled to the airframe;

wherein the shock strut includes a trunnion, the trunnion being rotatably coupled to the airframe at a trunnion axis of rotation so that the shock strut rotates about the trunnion axis of rotation between a shock strut stowed position and a shock strut extended position relative to the airframe; and wherein the positioning mechanism is coupled to the retraction mechanism so that rotation of the truck lever about the truck pivot axis of rotation, between the truck lever extended position and the truck lever stowed position, is mechanically slaved to rotation of the shock strut about the trunnion axis of rotation.

A11. The semi-levered landing gear of paragraph A1, wherein the truck lever includes but one wheel axis.

A12. The semi-levered landing gear of paragraph A11, wherein the but one wheel axis is proximate the truck lever first end.

A13. The semi-levered landing gear of paragraph A1, wherein rotation of the truck lever to the truck lever extended position provides the aircraft with a greater angle of attack at takeoff compared to an aircraft having a same length and but one wheel axis on a shock strut.

A14. The semi-levered landing gear of paragraph A1, wherein rotation of the truck lever about the truck pivot axis of rotation provides the aircraft with a same static ground height compared to an aircraft having a same length and but one wheel axis on a shock strut.

A15. The semi-levered landing gear of paragraph A1, wherein rotation of the truck lever to the truck lever stowed position provides for positioning of a trunnion axis of rotation of the shock strut closer to a longitudinal centerline of the aircraft compared to an aircraft having a shock strut stroke with a same uncompressed length at stowage.

A16. The semi-levered landing gear of paragraph A1, wherein with the truck lever in the truck lever extended position, the semi-levered landing gear provides the aircraft with a predetermined amount of ground contact vertical load so that the aircraft rotates to a greater angle of attack at takeoff compared to an aircraft having a same length shock strut and but one wheel axis on the shock strut.

A17. The semi-levered landing gear of paragraph A1, wherein:
the inner cylinder is movable relative to the outer cylinder; and
the truck lever is rotatably coupled to either the inner cylinder or the outer cylinder.

A18. The semi-levered landing gear of paragraph A1, wherein the truck lever comprises a monolithic member.

B1. An aircraft comprising:
an airframe; and
a semi-levered landing gear including
a shock strut coupled to the airframe;
a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end;
a tension link assembly having a tension link assembly first end, a tension link assembly second end and at least one tension link assembly rotation axis disposed between the tension link assembly first end and the tension link assembly second end, the tension link assembly first end coupled to the shock strut, and the tension link assembly second end being coupled to the truck lever second end;
a positioning mechanism coupled to one or more of the airframe and the shock strut and being coupled to the tension link assembly proximate the tension link assembly first end;
wherein the tension link assembly is configured to rotate the truck lever about the truck pivot axis of rotation between a truck lever extended position and a truck lever stowed position.

B2. The aircraft of paragraph B1, wherein rotation of the truck lever to the truck lever extended position provides the aircraft with a greater angle of attack at takeoff compared to an aircraft having a same length and but one wheel axis on a shock strut.

B3. The aircraft of paragraph B1, wherein rotation of the truck lever about the truck pivot axis of rotation provides the aircraft with a same static ground height compared to an aircraft having a same length shock strut and but one wheel axis on the shock strut.

B4. The aircraft of paragraph B1, wherein rotation of the truck lever to the truck lever stowed position provides for positioning of a trunnion axis of rotation of the shock strut closer to a longitudinal centerline of the aircraft compared to an aircraft having a shock strut stroke with a same uncompressed length at stowage.

B5. The aircraft of paragraph B1, wherein with the truck lever in the truck lever extended position, the semi-levered landing gear provides the aircraft with a predetermined amount of ground contact vertical load so that the aircraft rotates to a greater angle of attack at takeoff compared to an aircraft having a same length and but one wheel axis on a shock strut.

B6. The aircraft of paragraph B1, wherein the shock strut is substantially uncompressed with the truck lever at the truck lever extended position and with the truck lever at the truck lever stowed position.

B7. The aircraft of paragraph B1, wherein the tension link assembly is configured so that the truck lever rotates about the truck pivot axis of rotation during compression of the shock strut.

B8. The aircraft of paragraph B1, wherein the tension link assembly comprises:
an over-center link having an over-center link first end and an over-center link second end longitudinally spaced from the over-center link first end, the over-center link first end defining the tension link assembly first end and being rotatably coupled to the shock strut about an over-center pivot axis; and
a truck link having a truck link first end and a truck link second end longitudinally spaced from the truck link first end, the truck link first end being rotatably coupled to the over-center link second end about the tension link assembly rotation axis and the truck link second end defining the tension link assembly second end and being rotatably coupled to the truck lever second end.

B9. The semi-levered landing gear of paragraph B8, wherein the positioning mechanism comprises:
a connecting link having a connecting link first end and a connecting link second end, the connecting link first end coupled to one or more of the airframe and the shock strut;
a first pivot link having a first end and a second end longitudinally spaced from the first end, the first end of the first pivot link being rotatably coupled to the shock strut; and
a second pivot link having a first end and a second end longitudinally spaced from the first end, the first end of the second pivot link being rotatably coupled to the second end of the first pivot link;
wherein the connecting link second end is coupled to at least one of proximate the second end of the first pivot link and proximate the first end of the second pivot link.

B10. The aircraft of paragraph B9, wherein:
the second end of the second pivot link is rotatably coupled to the over-center link proximate the over-center link second end so that movement of the connecting link causes rotation of the truck link first end about the over-center pivot axis.

B11. The aircraft of paragraph B8, wherein the connecting link comprises a linear actuator and the connecting link first end is coupled to the shock strut or the airframe.

B12. The aircraft of paragraph B8, wherein the connecting link comprises a hydraulic actuator and the connecting link first end is coupled to the shock strut or the airframe.

B13. The aircraft of paragraph B8, wherein the connecting link is a rigid unarticulated link.

B14. The aircraft of paragraph B1, further comprising:
a retraction mechanism coupled to the airframe;
wherein the shock strut includes a trunnion, the trunnion being rotatably coupled to the airframe at a trunnion axis of rotation so that the shock strut rotates about the trunnion axis of rotation between a shock strut stowed position and a shock strut extended position relative to the airframe; and wherein the positioning mechanism is coupled to the retraction mechanism so that rotation of the truck lever about the truck pivot axis of rotation, between the truck lever extended position and the truck lever stowed position, is mechanically slaved to rotation of the shock strut about the trunnion axis of rotation.

B15. The aircraft of paragraph B1, wherein the truck lever includes but one wheel axis.

B16. The aircraft of paragraph B15, wherein the but one wheel axis is proximate the truck lever first end.

B17. The aircraft of paragraph B1, wherein:
the shock strut comprises an outer cylinder and an inner cylinder, where the inner cylinder is movable relative to the outer cylinder; and
the truck lever is rotatably coupled to either the inner cylinder or the outer cylinder.

B18. The aircraft of paragraph B1, wherein the truck lever comprises a monolithic member.

C1. A semi-levered landing gear comprising:
a shock strut coupled to an airframe of an aircraft about a trunnion axis of rotation;
a retraction mechanism coupled to the airframe;
a truck lever having a truck lever first end and a truck lever second end longitudinally spaced from the truck lever first end, the truck lever being rotatably coupled to the shock strut about a truck pivot axis of rotation that is disposed between the truck lever first end and the truck lever second end;
a tension link assembly having a tension link assembly first end, a tension link assembly second end and at least one tension link assembly rotation axis disposed between the tension link assembly first end and the tension link assembly second end, the tension link assembly first end being coupled to the shock strut, and the tension link assembly second end being coupled to the truck lever second end; and
a positioning mechanism being configured for coupling to one or more of the airframe and the shock strut and being coupled to the tension link assembly proximate the tension link assembly first end;
wherein rotation of the truck lever about the truck pivot axis of rotation between a truck lever extended position and a truck lever stowed position is mechanically slaved to rotation of the shock strut about the trunnion axis of rotation.

C2. The semi-levered landing gear of paragraph C1, wherein movement of the retraction mechanism causes rotation of the shock strut such that the corresponding movement of the retraction mechanism actuates the tension link assembly to rotate the truck lever about the truck pivot axis of rotation between the truck lever extended position and the truck lever stowed position.

C3. The semi-levered landing gear of paragraph C1, wherein the shock strut is substantially uncompressed with the truck lever at the truck lever extended position and with the truck lever at the truck lever stowed position.

C4. The semi-levered landing gear of paragraph C1, wherein the tension link assembly is configured so that the truck lever rotates about the truck pivot axis of rotation during compression of the shock strut.

C5. The semi-levered landing gear of paragraph C1, wherein the tension link assembly comprises:
an over-center link having an over-center link first end and an over-center link second end longitudinally spaced from the over-center link first end, the over-center link first end defining the tension link assembly first end and being rotatably coupled to the shock strut about an over-center pivot axis; and a truck link having a truck link first end and a truck link second end longitudinally spaced from the truck link first end, the truck link first end being rotatably coupled to the over-center link second end about the tension link assembly rotation axis and the truck link second end defining the tension link assembly second end and being rotatably coupled to the truck lever second end.

C6. The semi-levered landing gear of paragraph C5, wherein the positioning mechanism comprises:
a connecting link having a connecting link first end and a connecting link second end, the connecting link first end being configured for coupling to one or more of the airframe and the shock strut;
a first pivot link having a first end and a second end longitudinally spaced from the first end, the first end of the first pivot link being rotatably coupled to the shock strut; and
a second pivot link having a first end and a second end longitudinally spaced from the first end, the first end of the second pivot link being rotatably coupled to the second end of the first pivot link;
wherein the connecting link second end is coupled to at least one of proximate the second end of the first pivot link and proximate the first end of the second pivot link.

C7. The semi-levered landing gear of paragraph C6, wherein:
the second end of the second pivot link is rotatably coupled to the over-center link proximate the over-center link second end so that movement of the connecting link causes rotation of the truck link first end about the over-center pivot axis.

C8. The semi-levered landing gear of paragraph C5, wherein the connecting link is a rigid unarticulated link.

C9. The semi-levered landing gear of paragraph C5, wherein the shock strut rotates about the trunnion axis of rotation between a shock strut stowed position and a shock strut extended position relative to the airframe.

C10. The semi-levered landing gear of paragraph C1, wherein the truck lever includes but one wheel axis.

C11. The semi-levered landing gear of paragraph C10, wherein the but one wheel axis is proximate the truck lever first end.

C12. The semi-levered landing gear of paragraph C1, wherein rotation of the truck lever to the truck lever extended position provides the aircraft with a greater angle of attack at takeoff compared to an aircraft having a same length and but one wheel axis on a shock strut.

C13. The semi-levered landing gear of paragraph C1, wherein rotation of the truck lever about the truck pivot axis of rotation provides the aircraft with a same static ground height compared to an aircraft having a same length and but one wheel axis on a shock strut.

C14. The semi-levered landing gear of paragraph C1, wherein rotation of the truck lever to the truck lever stowed position provides for positioning of the trunnion axis of rotation of the shock strut closer to a longitudinal centerline of the aircraft compared to an aircraft having a shock strut stroke with a same uncompressed length at stowage.

C15. The semi-levered landing gear of paragraph C1, wherein with the truck lever in the truck lever extended position, the semi-levered landing gear provides the aircraft with a predetermined amount of ground contact vertical load so that the aircraft rotates to a greater angle of attack at takeoff compared to an aircraft having a same length shock strut and but one wheel axis on the shock strut.

C16. The semi-levered landing gear of paragraph C1, wherein:

the shock strut comprises an outer cylinder and an inner cylinder, where the inner cylinder is movable relative to the outer cylinder; and the truck lever is rotatably coupled to either the inner cylinder or the outer cylinder.

C17. The semi-levered landing gear of paragraph C1, wherein the truck lever comprises a monolithic member.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A landing gear comprising:
   a shock strut assembly including an outer cylinder coupled to an airframe of an aircraft about a trunnion axis of rotation;

a wheel movably coupled to the outer cylinder so as to reciprocate substantially along a longitudinal axis of the outer cylinder; and a shrink mechanism including
- a pivot arm pivotally coupled to the shock strut assembly,
- a drive member coupling the pivot arm to a landing gear retract mechanism,
- a driven member coupled to the pivot arm,
- a first shrink link member coupled to the pivot arm by the driven member, and
- a second shrink link member coupled to the first shrink link member and to the shock strut assembly, so that rotation of the pivot arm by the drive member, effects a folding movement between the first shrink link member and the second shrink link member, and where the folding movement effects at least a retraction of the wheel relative to the outer cylinder.

2. The landing gear of claim 1, wherein:
the pivot arm pivots about a first axis of rotation; and
the first shrink link member pivots about a second axis of rotation that is spaced from the first axis of rotation.

3. The landing gear of claim 1, further comprising:
a lever member coupled to the first shrink link member so that the lever member and the first shrink link member rotate with each other in a same direction; and
wherein the driven member drives rotation of the first shrink link member through the lever member and effects extension and retraction of the wheel relative to the outer cylinder substantially along the longitudinal axis of the outer cylinder.

4. The landing gear of claim 1, wherein:
the first shrink link member includes a first end rotatably coupled to the shock strut assembly and a second end rotatably coupled to the second shrink link member; and
the driven member is pivotally coupled to the first shrink link member adjacent the second end so as to drive rotation of the first shrink link member and effect extension or retraction of the wheel relative to the outer cylinder and substantially along the longitudinal axis of the outer cylinder.

5. The landing gear of claim 1, wherein the first shrink link member and the second shrink link member are rotatably coupled to each other so as to fold and unfold relative to each other and lock in an over-center position.

6. The landing gear of claim 1, wherein the outer cylinder includes walls, the first shrink link member and the second shrink link member, in a folded configuration, being at least partially disposed between the walls.

7. The landing gear of claim 1, wherein the driven member is coupled to the first shrink link member so as to effect, under impetus of the drive member, folding and unfolding of the second shrink link member relative to the first shrink link member.

8. The landing gear of claim 1, wherein the outer cylinder includes a first end having the trunnion axis of rotation and a second end longitudinally spaced from the first end, the pivot arm being pivotally coupled to the outer cylinder between the first end and the second end.

9. The landing gear of claim 1, wherein the outer cylinder includes an over-center stop surface configured to couple with the shrink mechanism to effect over-center locking of the first shrink link member and the second shrink link member.

10. An aircraft comprising:
an airframe; and
a landing gear coupled to the frame, the landing gear including
- a shock strut assembly including an outer cylinder coupled to the airframe about a trunnion axis of rotation;
- a wheel movably coupled to the outer cylinder so as to reciprocate substantially along a longitudinal axis of the outer cylinder; and
- a shrink mechanism including
  - a pivot arm pivotally coupled to the shock strut assembly,
  - a drive member coupling the pivot arm to a landing gear retract mechanism,
  - a driven member coupled to the pivot arm,
  - a first shrink link member coupled to the pivot arm by the driven member, and
  - a second shrink link member coupled to the first shrink link member and to the shock strut assembly, so that rotation of the pivot arm by the drive member, effects a folding movement between the first shrink link member and the second shrink link member, and where the folding movement effects at least a retraction of the wheel relative to the outer cylinder.

11. The aircraft of claim 10, wherein:
the pivot arm pivots about a first axis of rotation; and
the first shrink link member pivots about a second axis of rotation that is spaced from the first axis of rotation.

12. The aircraft of claim 10, further comprising:
a lever member coupled to the first shrink link member so that the lever member and the first shrink link member rotate with each other in a same direction; and
wherein the driven member drives rotation of the first shrink link member through the lever member and effects extension and retraction of the wheel relative to the outer cylinder substantially along the longitudinal axis of the outer cylinder.

13. The aircraft of claim 10, wherein:
the first shrink link member includes a first end rotatably coupled to the shock strut assembly and a second end rotatably coupled to the second shrink link member; and
the driven member is pivotally coupled to the first shrink link member adjacent the second end so as to drive rotation of the first shrink link member and effect extension or retraction of the wheel relative to the outer cylinder and substantially along the longitudinal axis of the outer cylinder.

14. The aircraft of claim 10, wherein the first shrink link member and the second shrink link member are rotatably coupled to each other so as to fold and unfold relative to each other and lock in an over-center position.

15. The aircraft of claim 10, wherein the outer cylinder includes walls, the first shrink link member and the second shrink link member, in a folded configuration, being at least partially disposed between the walls.

16. The aircraft of claim 10, wherein the driven member is coupled to the first shrink link member so as to effect, under impetus of the drive member, folding and unfolding of the second shrink link member relative to the first shrink link member.

17. The aircraft of claim 10, wherein the outer cylinder includes a first end having the trunnion axis of rotation and a second end longitudinally spaced from the first end, the pivot arm being pivotally coupled to the outer cylinder between the first end and the second end.

18. The aircraft of claim 10, wherein the outer cylinder includes an over-center stop surface configured to couple with the shrink mechanism to effect over-center locking of the first shrink link member and the second shrink link member.

\* \* \* \* \*